L. A. THIELE.
METHOD OF AND APPARATUS FOR MAKING SULFURIC ACID.
APPLICATION FILED FEB. 12, 1917.
1,267,012.
Patented May 21, 1918.
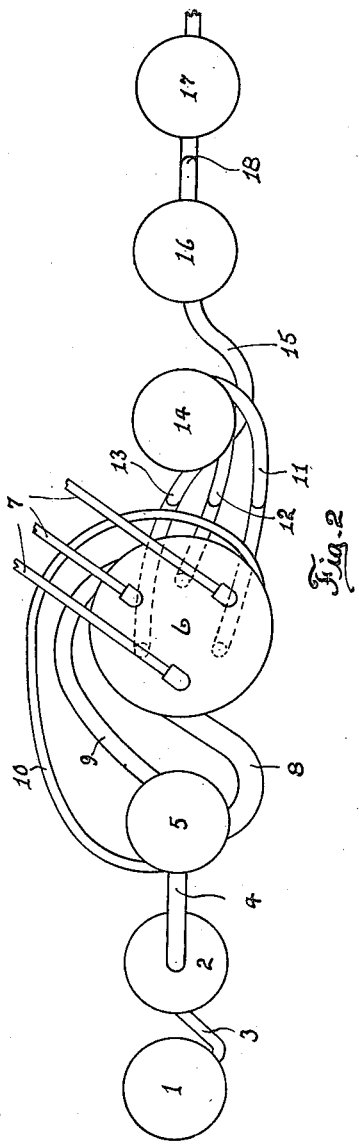
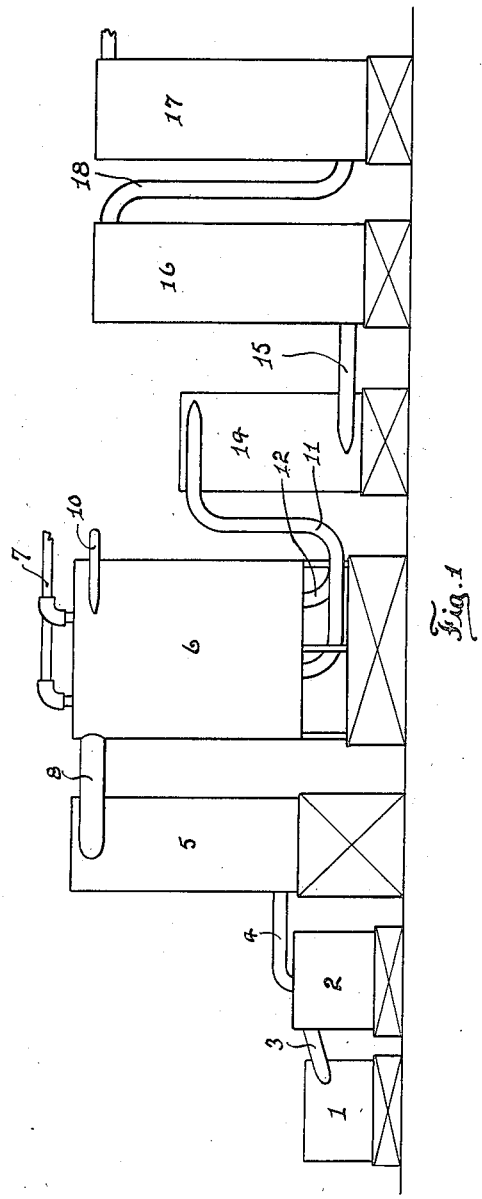

UNITED STATES PATENT OFFICE.

LUDWIG A. THIELE, OF COLUMBUS, OHIO.

METHOD OF AND APPARATUS FOR MAKING SULFURIC ACID.

1,267,012.   Specification of Letters Patent.   Patented May 21, 1918.

Application filed February 12, 1917. Serial No. 148,020.

*To all whom it may concern:*

Be it known that I, LUDWIG A. THIELE, a citizen of the United States, residing at Columbus, in the county of Franklin and State of Ohio, have invented certain new and useful Improvements in Methods of and Apparatus for Making Sulfuric Acid, of which the following is a specification.

This invention relates to a method of and apparatus for making sulfuric acid. Specifically, the present invention is directed as an improvement of the tangent system shown and described in Patent #688,872, issued December 7, 1901, to Theodore Meyer.

The all important and controlling feature in the manufacture of sulfuric acid is the economy of the cubic space required for the conversion of the sulfur dioxid into sulfuric acid, the reduction of the space required also causing a reduction of the lead sheets required in the erection of a plant. To this end, the main object of my invention resides in a method of and apparatus for causing a rapid and continuous circulation and thorough mixing of the gases from which the acid is made. Additionally, I aim to reduce the dead space in the bottom of the acid or reaction chambers, thus increasing the capacity of the system as a whole.

The accompanying sheet of drawings represents diagrammatically, an apparatus by which my method may be carried out and in which similar characters of reference designate corresponding parts throughout the several views. In these drawings:

Figure 1 is a view in side elevation, and,

Fig. 2 is a view in plan of a sulfuric acid manufacturing plant.

The patent to Meyer referred to above, shows a series of acid or reaction chambers, in which the gases from which the acid is made, are shown as being introduced tangentially and also providing a single centrally disposed outlet for each chamber. It will be understood that the efficiency of the plant depends on the degree and the rapidity with which the various gases are caused to mix in order to form the sulfuric acid and to this end, my method and structure consists in introducing the gases to these acid chambers by a plurality of conduits, the rate of flow from the various conduits being different. By this manner, the gases are introduced at different speeds and especially where this introduction is made tangentially, the gases are made to commingle more thoroughly than where a uniform rate of introduction is provided for. The novelty of the apparatus by which this is accomplished, is found in providing conduits of different lengths and of different sectional areas, the smallest pipe being of the greatest length and the largest pipe or conduit of the shortest length. These pipes or conduits are made of heat conducting and radiating material and thus the gases entering the acid chamber through the shortest pipe, will be warmer than those entering through the smallest pipe. Also, the volume in the largest pipe will be greater than the volume in the smallest pipe and, therefore, cooling of the gases in the smallest pipe is also more readily accomplished.

With this arrangement, and knowing the properties of gases, it follows that for a constant pressure supply, where the temperature of the gases flowing through the pipes is reduced, the pressure of those gases in the pipes must be correspondingly reduced, since the volume cannot be changed, the pressure varying directly with the volume and inversely with the temperature. Then, by dissipating a portion of the heat of these gases through radiation, the gases enter the acid chamber or chambers under different velocities, which of necessity must cause a more thorough mixing than where they all enter uniformly.

With the above explanation, the drawings will now be described. The reference numeral 1 indicates a furnace or kiln, into which pyrites or other sulfur producing ore is introduced and burned for the production of the sulfur dioxid gases. From here, the sulfur dioxid enters a dust collector 2 by means of a conduit 3, whereby the gases are cleansed to a certain degree. These gases then leave the dust collector 3 by means of a conduit 4 and enter the Glover tower 5, which is of well known construction. It will be understood that in the commercial production of this acid, the Glover tower is rinsed in the usual manner with sulfuric acid containing the dissolved oxids of nitrogen produced from the Gay-Lussac towers to be presently described, and fed to the top of the Glover tower by a conduit, not shown. The additional amount of nitrous oxids necessary to be introduced into the system is formed by either decomposing saltpeter in a niter oven as usual and enter together with the sulfur dioxid at the foot of the Glover tower, or in the form of nitric acid run into the tower from the top of said structure, not specifically shown in the drawings. The acid containing these oxids of nitrogen and water, meet the sulfur dioxid gases and air in this Glover tower, whereby action of the hot gases, the nitrous oxids from the Gay-Lussac acid are liberated and the acid flows down the tower and reaches the foot in a concentrated state. This nitrous oxid then combines with the sulfur dioxid and air from the furnaces and mixes and passes into the reaction chamber or chambers 6. Water or steam through pipes 7, is introduced into the upper portion of the acid chamber 6, which water, together with the nitrous dioxid constitute the catalytic agent in the production of the acid. It is at the point where these gases are introduced into the acid chamber, that the greatest care must be taken and to which my invention is particularly directed. These gases are introduced as I have stated, by three conduits 8, 9 and 10, all these conduits communicating with the circular acid chamber to introduce the gases tangentially and being of gradually increasing length. Also, these conduits vary as to sectional area, which correspondingly varies their carrying capacity, the conduit 8 being the shortest in length and largest in diameter, while the conduit 10 is the longest in length and shortest in diameter. Therefore, the gases passing through the conduit 10 come into more intimate relation with the cooling surface of the conduits whereby a greater amount of heat per unit is dissipated than that passing through the conduit 8. It must necessarily follow, therefore, that the gases through the pipe 10 enter the acid chamber 6 in a cooler state than those from the pipe 8 and consequently the rate of flow from the pipe 10 is less than the flow from the pipe 8. These gases are introduced tangentially to create a circular spiral motion within the acid chamber and one stream overtaking the other, must of necessity cause a more thorough mixing. This mixing of the gases in the presence of the catalytic agent water, causes the chemical union of the gases to form sulfuric acid, as is well known. This chemical union, however, causes the generation of considerable heat, which is dissipated through the metallic walls of the acid chamber and gradually as the gases are cooled, those remaining leave the chamber through outlets in its bottom. It will be understood that any number of chambers 6 found necessary may be provided, although I have only shown one in the present drawings.

As is apparent, the gases within the chamber 6 move with a circular spiral movement and where a single centrally disposed outlet is provided, the gases in their escape must naturally follow somewhat the shape of a funnel, thus leaving the lower portion of the chamber as a dead air space. To overcome this, I have provided a plurality of outlets, in the present instance three, arranged on a circle concentric with the reaction chamber and whose diameter is approximately half that of the reaction chamber. By this arrangement, the gases escape through three outlets, each creating a circular spiral movement. Therefore, a greater volume of the acid chamber is occupied directly by the gases than would otherwise be the case. The three outlet conduits are designated 11, 12 and 13 and tangentially introduce these gases to the top of the cooling tower 14 where their chemical union takes place and the gases remaining, escaping through the pipe 15 to the Gay-Lussac towers 16 and 17 connected to each other by a pipe 18. At this point, the oxids of nitrogen may be removed from the remaining gases by passing them through the Gay-Lussac towers rinsed in the usual manner with cooled sulfuric acid from any source, such as from the Glover tower. This arrangement is well known to the art and has not been shown in the drawings. The Gay-Lussac acid or nitrous vitriol containing the oxids of nitrogen is again introduced to the Glover tower, as has been previously related and the operation maintained continuously.

From the foregoing, it will be apparent that an apparatus and method has been provided whereby a rapid and continuous circulation and thorough mixing of the gases may be obtained and also wherein the dead space in the bottom of the acid chambers has been reduced, thereby reducing the cubic space of the plant as a whole. This thorough mixing is caused by introducing the gases to the acid chamber at different speeds whereby a greater supply of acid may be produced than heretofore. The dead space is reduced by providing a plurality of outlets 11, 12 and 13 as has already been described.

What I claim, is:

1. The method of making sulfuric acid which consists in introducing the gases from which the acid is made into an acid chamber by a plurality of conduits and at a different rate of flow from each conduit.

2. The method of making sulfuric acid which consists in introducing the gases from which the acid is made into an acid chamber by a plurality of conduits and at a different rate of flow from each conduit, and withdrawing these gases from the bottom of said chamber by a plurality of spaced outlets.

3. The method of making sulfuric acid which consists in imparting to the gases of which the acid is made, a circular spiral motion within a chamber, the gases being introduced at the top of the chamber and withdrawn from the bottom of the chamber by a plurality of outlets arranged concentrically with the chamber wall.

5. The method of making sulfuric acid which consists in introducing the gases from which the acid is made into an acid chamber by a plurality of conduits and causing the gases to be cooled so that the streams are all at different temperatures.

5. A sulfuric acid plant comprising a Glover tower, an acid chamber, and a plurality of pipe connections between said tower and said chamber, said connections being of different sectional areas.

6. A sulfuric acid plant comprising a Glover tower, an acid chamber, and a plurality of pipe connections between said tower and said chamber, said connections being of different sectional areas and of different lengths.

7. A sulfuric acid plant comprising a Glover tower, an acid chamber, and a plurality of pipe connections between said tower and said chamber and entering said chamber tangentially, said connections being of different sectional areas and different lengths, the smallest pipe being of the greatest length and the largest of the shortest length.

8. In a sulfuric acid plant, an acid chamber, means for introducing the gases at the top of said chamber, and a plurality of spaced outlet conduits at the bottom of said chamber.

9. In a sulfuric acid plant, a circular acid chamber, means for introducing the gases at the top of said chamber, and a plurality of outlet conduits concentrically arranged in the bottom of the chamber on a diameter approximately half the diameter of the chamber.

10. A sulfuric acid plant comprising a Glover tower, an acid chamber, a plurality of pipe connections between said tower and said chamber and entering said chamber tangentially, said connections being of different sectional areas and different lengths, the smallest pipe being of the greatest length and the largest of the shortest length, and a plurality of outlet conduits concentrically arranged in the bottom of the chamber on a diameter approximately half the diameter of the chamber.

In testimony whereof I affix my signature in presence of two witnesses.

LUDWIG A. THIELE.

Witnesses:
WALTER E. L. BOCK,
A. L. PHELPS.